Patented Oct. 18, 1932

1,883,353

UNITED STATES PATENT OFFICE

HENRY DREYFUS, OF LONDON, ENGLAND

MANUFACTURE OF ALIPHATIC ANHYDRIDES

No Drawing. Application filed May 10, 1929, Serial No. 362,133, and in Great Britain May 26, 1928.

This invention relates to the manufacture of aliphatic anhydrides from aliphatic acids and especially to the manufacture of acetic anhydride from acetic acid.

It is known that aliphatic anhydrides may be produced by subjecting vapours of aliphatic acids to thermal decomposition and various catalysts have been proposed for the reaction, see for instance, U. S. Patent Nos. 1,735,956 and 1,735,962 of November 19, 1929.

I have now found that highly satisfactory results are obtained when the reaction is performed in presence of certain catalysts, namely, nitrogen-containing inorganic or organic bases or salts thereof, such for instance as ammonia, alkylammonium bases (i. e. primary, secondary and tertiary alkylamines) or tetra alkylammonium bases, pyridine, picoline, quinoline, piperidine, aniline, alkylanilines, cyclohexylamine, toluidines, or hydrochlorides, phosphates, sulphates or other salts of such bases. All such bases and their salts are hereinafter in the claims included in the term nitrogenous basic substance.

According to the invention, therefore, I produce aliphatic anhydrides (and especially acetic anhydride) by subjecting aliphatic acid vapour (and especially acetic acid vapour) to thermal decomposition in presence of one or more non-metallic inorganic or organic bases or salts thereof.

The reaction may be performed at temperatures of from about 200° to 700° C. and preferably at temperatures of from about 300° to 700° C.

The reaction may be performed in any convenient way, for instance, by passing the aliphatic acid vapour, in presence of one or more of the bases or salts, through fireclay, silica, copper or other tubes or other form of reaction zone heated to the desired temperature. In cases where the bases or salts are relatively or substantially non-volatile under the conditions of reaction they may conveniently be employed in the solid or liquid state, preferably coated upon or impregnated in balls or stones in pumice, kieselguhr, carborundum or other filling materials. For instance, the reaction may conveniently be performed by passing acetic or other aliphatic acid vapour in a rapid stream through a tube or other reaction zone filled with pumice, kieselguhr or the like coated or impregnated with benzidine, one or more toluidines or other bases or salts which are substantially non-volatile under the temperatures and pressures employed.

In cases where volatile bases or salts are employed the reaction may conveniently be performed by passing a mixture of the aliphatic acid vapour and the base or bases, or salt or salts (e. g. ammonia, ethylamine, diethylamine or other bases or salts which are volatile under the temperatures and pressures employed for the reaction) through fire clay, silica or other tubes or other form of reaction zone heated to the desired temperature, and in such cases the reaction zone is preferably provided or filled with balls, stones or pieces of pumice, kieselguhr, carborundum or like filling materials. Further in such cases the reaction zone may, if desired, contain one or more catalysts hitherto known to promote the scission of aliphatic acids into their anhydrides, or one or more of the said substantially non-volatile bases or salts.

The mixtures of aliphatic acid vapour and the volatile bases or salts may of coure be prepared in any convenient way, for instance, by simple admixture in the vapour state. In performing the reaction I preferably employ mixtures containing about 1 to 10% of the base or salt relatively to the aliphatic acid, though I in no wise restrict myself in this respect, as larger or smaller proportions of the base or salt may be employed.

Instead of first mixing the volatile bases or salts with the aliphatic acid vapour they, if desired, may be injected separately in solid, liquid or vapour form into the heated reaction zone through which the aliphatic acid vapour is passed in a stream.

It is to be understood that the invention is not limited as to the pressure employed, as the process of the invention may be performed under ordinary atmospheric pressure, or under reduced pressure or "vacuum" or under higher pressures than atmospheric, for instance, under pressures of from 3 to 10 atmospheres or more.

The anhydride produced by the process may be separated from the reaction gases or vapours in any suitable way. The reaction gases or vapours may, if desired, be passed over or otherwise in contact with an acid stronger than the aliphatic acid employed (for instance in contact with or presence of phosphoric acid or hydrochloric acid), prior to the separation or recovery of the anhydride, in order to neutralize or bind as far as possible any base or bases present. The anhydride separated or recovered from the reaction gases or vapours may if desired or required be purified by any suitable means. For instance, it may be treated with phosphoric or hydrochloric acid to fix any base or bases present and distilled from an anhydrous acetate (e. g. anhydrous sodium acetate).

In the recovery or separation of the anhydride from the reaction vapours the reaction gases or vapours are preferably not submitted to simple condensation, as such condensation involves hydrolysis and consequent loss of anhydride, but they are preferably treated to separate the anhydride from the water vapour present or formed in the reaction. For instance, the gases or vapours from the reaction zone may, if desired, after passing over or otherwise in contact with phosphoric or hydrochloric or like strong acid, be subjected to fractional condensation for example by leading them up through one or more fractionating columns maintained at a temperature or temperatures intermediate between the boiling points (under the conditions of pressure obtaining) of the anhydride and of water, whereby the anhydride is condensed and the water passes on in vapour form.

Or, for instance, the reaction gases or vapours may, if desired, after passing over or otherwise in contact with hydrochloric or phosphoric or like strong acid to bind or fix any free bases present, be passed through one or more solvents for the anhydride which are insoluble in water and which have higher boiling points than water (preferably of higher boiling point than the anhydride), such solvents being employed at temperatures intermediate between the boiling points (under the conditions of pressure obtaining) of water and of the anhydride, whereby the anhydride is condensed or absorbed and the water escapes in vapour form. As examples of such solvents may be mentioned chlorbenzene, paradichlorbenzene, benzylether, tetrachlorethane, paraffin oil, triacetin, phenetol, anisol, one or more cresols, and paracresyl acetate.

Or, for instance, the reaction gases or vapours may, if desired, after passing over or otherwise in contact with hydrochloric, phosphoric or like strong acid to bind or fix any free bases present, be subjected to condensation by the process described in U. S. application S. No. 284,566 filed 11 June 1928, that is to say the anhydride may be condensed from the reaction vapours whilst carrying away the water vapour by the vapour of one or more "entraining" liquids. In such form of execution the reaction vapours are preferably mixed after leaving the reaction zone (and if desired after passing in contact with phosphoric, hydrochloric or like strong acid), with the vapours of the entraining liquid or liquids at a temperature below the boiling point (under the conditions of pressure obtaining) of the anhydride. Conveniently such mixing may be performed by introducing the reaction vapours (which should not be allowed to cool below the boiling point of water before becoming mixed with the vapours of the entraining liquid or liquids) into a vessel up which the vapours of the entraining liquid or liquids are caused to rise; by this means the anhydride may be substantially condensed and the water vapour carried away with the vapours of the entraining liquid or liquids. Examples of entraining liquids which I may use for such method of condensation are benzene, carbon tetrachloride, petrol, mixtures of two or more of such bodies, or mixtures of ether with petroleum ether; it will be understood however that any other liquids chemically inert to the anhydride and having a high entraining capacity for water may be employed. The liquids should preferably have a low entraining capacity for the anhydride. Toluol, xylenes or other "entraining" liquids whose boiling points are intermediate between those of water and of the anhydride, are especially suitable for this method of separation.

Or again, for instance, the reaction gases or vapours may, if desired, after passing over or otherwise in contact with phosphoric, hydrochloric or like strong acids to bind or fix any free bases present, be subjected to condensation by the process described in U. S. application S. No. 285,613 filed 15 June 1928, that is to say they may be subjected to condensation by leading them under the surface of an "extracting" liquid cooled down or otherwise kept at temperatures below (and preferably considerably below) the boiling point of water. By the term "extracting" liquid is meant a liquid or liquid mixture in which the anhydride is soluble and which is chemically inert to the anhydride and insoluble or substantially insoluble in water. As examples of such "extracting" liquids may be mentioned benzene, chloroform and mixtures of ethyl ether or chloroform with one or more hydrocarbons such as light paraffins, gasoline, kerosene, benzol or its homologues. It is preferable to use as "extracting" liquids, liquids of the character referred to which are themselves hydrocarbons or which contain hydrocarbons, for example, benzene or mixtures of ethyl ether or chloroform with one or more hydrocarbons such as paraffins (particularly the petroleum fraction of boiling point 40° to 70° C. termed petroleum ether), gasoline (boiling point 70° to 90° C.), kerosene, benzol or its homologues. The following particular examples of "extracting" liquids are very suitable:— ether in admixture with petroleum ether, chloroform mixed with petroleum ether and/or gasoline; and mixtures of ether and petroleum ether containing about 30 to 50% petroleum ether are especially suitable.

Or again, for instance, the reaction vapours may, if desired after passing in contact with phosphoric, hydrochloric or like strong acid to bind or fix any bases present, be treated by the process described in my U. S. application S. No. 242,977 filed 27 December, 1927, that is to say they may be passed over or otherwise in contact with one or more "water binding" substances maintained at a temperature or temperatures below (and preferably substantially below) the temperature at which the reaction vapours are produced. By such treatment the water vapour may be substantially absorbed from the reaction vapours. In such treatment the water binding substances are preferably maintained at temperatures above the boiling point (under the conditions of pressure obtaining) of water to avoid condensation of water and resulting risk of loss of anhydride through hydrolysis, and for the best functioning of the treatment the water binding substances should be employed at temperatures above the boiling point of the anhydride in which case the water can be substantially absorbed and the anhydride pass on in vapour form. The term "water binding" substances means bisulphates, pyrosulphates (especially bisulphates and pyrosulphates of the alkali and earth alkali metals), zinc chloride, calcium chloride, orthophosphoric acid, pyrophosphoric acid, metaphosphoric acid and like substances which have affinity (and preferably high affinity) for water but excluding substances having a deleterious effect on aliphatic acids or anhydrides, such as sulphuric acid.

Or again, for instance, the reaction vapours may, if desired, after passing in contact with phosphoric, hydrochloric or like strong acid to bind or fix any free bases present, be subjected to condensation by the process described in previous U. S. application S. No. 330,577 filed 5 January 1929, that is to say they may be caused to impinge upon a flowing stream of benzene (or other water insoluble solvent for the anhydride) whereby the gases or vapours are quickly cooled and condensed and the anhydride separated from the water. The benzene (or other solvent) so employed may be collected and the water layer (usually the lower layer) which separates out may be removed and the benzene (or equivalent) layer distilled to recover the anhydride.

In cases where the thermal decomposition of the aliphatic acid vapour is performed under pressures higher than atmospheric it is preferable, prior to subjecting the reaction gases or vapours to treatment for recovery or separation of the anhydride, to pass the reaction gases or vapours through one or more reducing valves or like apparatus in order to reduce the pressure substantially to atmospheric.

It is to be understood that the invention is not limited as to the strength of aliphatic acid employed. The process can be performed even with the vapours of dilute acids; and besides affording a ready means for the manufacture of anhydrides from concentrated or highly concentrated acids, it affords valuable means for producing anhydrides from waste or dilute acids, especially waste or dilute acids such as result from the acetylation of cellulose or other industrial acetylation processes.

It is to be understood that in performing the present invention the thermal decomposition of the alipathic acid vapour may, if desired, be performed in presence of catalysts hitherto known to promote the scission of aliphatic acids into their anhydrides, whether the catalysts of the present invention are employed in vapour form, liquid form or solid form.

The following example serves to illustrate a convenient form of execution of the invention it being understood that it is given only by way of illustration and is in no way limitative.

*Example*

A mixture of acetic acid vapour and ammonia containing between 2% and 7% of ammonia is passed in a rapid stream through a copper or silica tube heated to a temperature between 550° and 600° C. The vapours resulting from the reaction are caused to pass upwards through one or more fractionating columns maintained at a temperature or temperatures intermediate between the boiling points of acetic anhydride and of water, whereby the anhydride is substantially condensed from the vapours whilst the water passes on in vapour form.

What I claim and desire to secure by Letters Patent is:—

1. Process for the manufacture of an aliphatic anhydride which comprises subjecting the vapor of an aliphatic acid to thermal decomposition in presence of at least one nitrogenous basic substance.

2. Process for the manufacture of an aliphatic anhydride which comprises subjecting the vapor of an aliphatic acid to thermal decomposition in presence of a nitrogen containing base.

3. Process for the manufacture of an aliphatic anhydride which comprises subjecting the vapor of an aliphatic acid to thermal decomposition in presence of a salt of a nitrogen containing base.

4. Process for the manufacture of an aliphatic anhydride which comprises subjecting the vapor of an aliphatic acid to thermal decomposition in presence of ammonia.

5. Process for the manufacture of an aliphatic anhydride which comprises subjecting the vapor of an aliphatic acid to thermal decomposition in presence of ammonium chloride.

6. Process for the manufacture of an aliphatic anhydride which comprises subjecting the vapor of an aliphatic acid to thermal decomposition in presence of at least one nitrogenous basic substance at a temperature between 200° and 700° C.

7. Process for the manufacture of an aliphatic anhydride which comprises subjecting to thermal decomposition a vaporous mixture of a volatile nitrogenous basic substance and an aliphatic acid.

8. Process for the manufacture of an aliphatic anhydride which comprises subjecting to thermal decomposition a vaporous mixture of a volatile nitrogenous basic substance and an aliphatic acid, containing between 1% and 10% of the volatile nitrogenous basic substance.

9. Process for the manufacture of an aliphatic anhydride which comprises subjecting a vaporous mixture of ammonia and an aliphatic acid containing between 1% and 10% of ammonia to thermal decomposition.

10. Process for the manufacture of an aliphatic anhydride which comprises subjecting a vaporous mixture of ammonia and an aliphatic acid containing between 2% and 7% of ammonia to thermal decomposition at a temperature between 550° and 600° C.

11. Process for the manufacture of acetic anhydride which comprises subjecting the vapor of acetic acid to thermal decomposition in presence of at least one nitrogenous basic substance.

12. Process for the manufacture of acetic anhydride which comprises subjecting the vapor of acetic acid to thermal decomposition in presence of a nitrogen containing base.

13. Process for the manufacture of acetic anhydride which comprises subjecting the vapor of acetic acid to thermal decomposition in presence of a salt of a nitrogen containing base.

14. Process for the manufacture of acetic anhydride which comprises subjecting the vapor of acetic acid to thermal decomposition in presence of ammonia.

15. Process for the manufacture of acetic anhydride which comprises subjecting the vapor of acetic acid to thermal decomposition in presence of at least one nitrogenous basic substance at a temperature between 300° and 700° C.

16. Process for the manufacture of acetic anhydride which comprises subjecting to thermal decomposition a vaporous mixture of a volatile nitrogenous basic substance and acetic acid.

17. Process for the manufacture of acetic anhydride which comprises subjecting to thermal decomposition a vaporous mixture of a volatile nitrogenous basic substance and acetic acid, containing between 1% and 10% of the volatile nitrogenous basic substance.

18. Process for the manufacture of acetic anhydride which comprises subjecting a vaporous mixture of ammonia and acetic acid containing between 2% and 7% of ammonia to thermal decomposition at a temperature between 550° and 600° C.

19. Process according to claim 1 and wherein the reaction vapors are treated to separate the anhydride from the water vapor present in said vapor.

In testimony whereof I have hereunto subscribed my name.

HENRY DREYFUS.